United States Patent
Ko et al.

(10) Patent No.: US 11,284,406 B2
(45) Date of Patent: *Mar. 22, 2022

(54) WIRELESS COMMUNICATION SYSTEM USING MULTIPLE TRANSMISSION AND RECEPTION POINTS

(71) Applicant: Electronics and Telecommunications Research Institute, Daejeon (KR)

(72) Inventors: Young-Jo Ko, Daejeon (KR);
Tae-Gyun Noh, Daejeon (KR);
Hee-Soo Lee, Daejeon (KR);
Bang-Won Seo, Daejeon (KR);
Jae-Young Ahn, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/370,870

(22) Filed: Mar. 29, 2019

(65) Prior Publication Data
US 2019/0230672 A1 Jul. 25, 2019

Related U.S. Application Data

(63) Continuation of application No. 15/411,812, filed on Jan. 20, 2017, now Pat. No. 10,292,169, which is a
(Continued)

(30) Foreign Application Priority Data

Feb. 11, 2011 (KR) .................. 10-2011-0012547
Feb. 14, 2011 (KR) .................. 10-2011-0012798

(51) Int. Cl.
*H04W 72/04* (2009.01)
*H04W 16/32* (2009.01)
(Continued)

(52) U.S. Cl.
CPC .......... *H04W 72/082* (2013.01); *H04B 7/024* (2013.01); *H04J 11/0079* (2013.01);
(Continued)

(58) Field of Classification Search
CPC ..... H04B 7/024; H04B 17/24; H04J 11/0079; H04L 5/0035; H04L 5/005; H04L 5/0051;
(Continued)

(56) References Cited

U.S. PATENT DOCUMENTS 8,472,954 B2  6/2013  Nogami et al.
8,995,293 B2  3/2015  Jongren et al.
(Continued)

FOREIGN PATENT DOCUMENTS

JP   2014-505447 A1   2/2014
WO   2009/120791 A    10/2009
WO   2011/017515 A2   2/2011

OTHER PUBLICATIONS

3GPP TR 36.814 V9.0.0, "3rd Generation Partnership Project: Technical Specification Group Radio Access Network; Evolved Universal Terrestrial Radio Access (E-UTRA); Further advancements for E-UTRA physical layer aspects (Release 9)," Mar. 2010 (104 pages, in English).

(Continued)

*Primary Examiner* — Ahmed Elallam (57) ABSTRACT

Disclosed is a wireless communication system using multiple transmission and reception points. In a wireless communication system having a first transmission and reception point and at least one second transmission and reception point belonging to the same cell, the first transmission and reception point has a wider transmission area than the at least one second transmission and reception point, and the first transmission and reception point and the at least one second transmission and reception point generate downlink
(Continued)

transmission signals by using the same physical layer cell ID or virtual cell IDs allocated to each terminal, and then the terminals generate uplink transmission signals by using the allocated virtual cell IDs.

18 Claims, 5 Drawing Sheets

Related U.S. Application Data continuation of application No. 13/984,880, filed as application No. PCT/KR2012/001001 on Feb. 10, 2012, now Pat. No. 9,560,663.

(51) Int. Cl.
| | |
|---|---|
| *H04B 17/24* | (2015.01) |
| *H04L 5/00* | (2006.01) |
| *H04W 72/08* | (2009.01) |
| *H04B 7/024* | (2017.01) |
| *H04J 11/00* | (2006.01) |
| *H04W 16/24* | (2009.01) |

(52) U.S. Cl.
CPC ............ *H04L 5/005* (2013.01); *H04L 5/0035* (2013.01); *H04L 5/0051* (2013.01); *H04W 16/32* (2013.01); *H04W 72/0406* (2013.01); *H04W 16/24* (2013.01)

(58) Field of Classification Search
CPC .. H04L 25/0224; H04W 16/24; H04W 16/32; H04W 72/0406; H04W 72/082; H04W 8/26; Y02D 30/70
See application file for complete search history.

(56) References Cited

U.S. PATENT DOCUMENTS

| | | | |
|---|---|---|---|
| 8,995,385 B2 | 3/2015 | Nam et al. | |
| 9,014,138 B2 | 4/2015 | Fong et al. | |
| 9,179,351 B2* | 11/2015 | Kang | ................ H04B 7/024 |
| 9,521,646 B2* | 12/2016 | Ji | ................ H04W 24/02 |
| 9,560,663 B2 | 1/2017 | Ko et al. | |
| 9,712,298 B2 | 7/2017 | Ko et al. | |
| 9,762,425 B2 | 9/2017 | Kang et al. | |
| 9,844,020 B2* | 12/2017 | Ji | ................ G01S 5/02 |
| 10,103,858 B2 | 10/2018 | Park et al. | |
| 10,292,169 B2* | 5/2019 | Ko | ................ H04W 72/082 |
| 10,631,324 B2* | 4/2020 | Fong | ................ H04W 72/042 |
| 10,826,658 B2* | 11/2020 | Fong | ................ H04W 72/042 |
| 2006/0023687 A1* | 2/2006 | Cheng | ................ H04B 1/707 370/342 |
| 2010/0062783 A1 | 3/2010 | Luo et al. | |
| 2011/0034175 A1 | 2/2011 | Fong et al. | |
| 2011/0038310 A1 | 2/2011 | Chmiel et al. | |
| 2011/0075624 A1 | 3/2011 | Papasakellariou et al. | |
| 2011/0077038 A1 | 3/2011 | Montojo et al. | |
| 2012/0294694 A1* | 11/2012 | Garot | ................ F27D 1/141 411/427 |
| 2013/0051214 A1 | 2/2013 | Fong et al. | |
| 2014/0254521 A1 | 9/2014 | Fong et al. | |
| 2015/0139151 A1* | 5/2015 | Seo | ................ H04J 13/18 370/329 |
| 2016/0374033 A1* | 12/2016 | Nogami | ................ H04J 11/0069 |
| 2017/0079003 A1* | 3/2017 | Ji | ................ H04W 72/0446 |
| 2017/0181145 A1* | 6/2017 | Fong | ................ H04L 5/001 |

OTHER PUBLICATIONS

R1-110248, "Views for Rel, 11 CoMP," eGPP TSG RAN WG1 Meeting #63bis, Jan. 21, 2011 (3 pages, in English).
R1-110461, "Baseline Schemes and Focus of CoMP Studies," 3GPP TSG RAN WG1 Meeting #63bis, Jan. 21, 2011 (2 pages, in English).
R1-110461, "Baseline Schemes and Focus of CoMP Studies," 3GPP TSG-RAN WG1 #63bis, Jan. 21, 2011 (3 pages in English with Japanese coversheet).
R1-110649, "Aspects on Distributed RRUs with Shared Cell-ID for Heterogeneous Deployments," 3GPP TSG-RAN WG1 #64, Feb. 25, 2011 (12 pages in English with Japanese coversheet).
R1-111000, "Discussion on Further Details of Scenario 4," 3GPP TSG RAN WG1 Meeting #64, Feb. 25, 2011 (4 pages in English with Japanese coversheet).
Panasonic, "Discussion on PUCCH coordination for UL CoMP", 15.2 Coordinated Multipoint Transmission/Reception (COMP), 3GPP TSG RAN WG1 Meeting #56bis, pp. 1-3, Mar. 23-27, 2009, Seoul, Korea.
Panasonic, "Comparison of Orthogonal/Non-orthogonal CoMP transmission for PUCCH", 15.2 Coordinated Multipoint Transmission/Reception(COMP), 3GPP TSG RAN WG1 Meeting #58, pp. 1-5, Aug. 24-28, 2009, Shenzhen, China.
Non-final office action dated Mar. 11, 2015 for U.S. Appl. No. 13/984,880.
Final office action dated Aug. 21, 2015 for U.S. Appl. No. 13/984,880.
Non-final office action dated Mar. 16, 2016 for U.S. Appl. No. 13/984,880.
Notice of Allowance dated Sep. 20, 2016 for U.S. Appl. No. 13/984,880.
Non-final office action dated Nov. 7, 2017 for U.S. Appl. No. 15/411,812.
Final office action dated Jun. 15, 2018 for U.S. Appl. No. 15/411,812.
Notice of Allowance dated Jan. 3, 2019 for U.S. Appl. No. 15/411,812.
International Search Report dated Jul. 31, 2012 for International Application No. PCT/KR2012/001001.
R1-110426, "Some Consideration on CoMP Deployment Scenarios," 3GPP TSG0RAN WG1 #63BIS, Jan. 21, 2011 (3 pages in English with Japanese coversheet).

* cited by examiner

| PHYSICAL CHANNEL | LARGE-AREA TRANSMISSION/RECEPTION POINT | SMALL-AREA TRANSMISSION/RECEPTION POINT |
|---|---|---|
| PMCH | TRANSMIT USING SAME RADIO RESOURCES | |
| PBCH | TRANSMIT | NOT TRANSMIT |
| | TRANSMIT USING SAME RADIO RESOURCES | |
| PCFICH | TRANSMIT | NOT TRANSMIT |
| | TRANSMIT USING SAME RADIO RESOURCES | |
| PDCCH | TRANSMIT | NOT TRANSMIT |
| | TRANSMIT USING SAME RADIO RESOURCES | |
| PHICH | TRANSMIT | NOT TRANSMIT |
| | TRANSMIT USING SAME RADIO RESOURCES | |

| (REFERENCE) SIGNAL | LARGE-AREA TRANSMISSION/RECEPTION POINT | SMALL-AREA TRANSMISSION/RECEPTION POINT |
|---|---|---|
| SYNCHRONIZATION SIGNAL AND CRS | TRANSMIT | NOT TRANSMIT |
| | TRANSMIT USING SAME RADIO RESOURCES | |
| CSI-RS | TRANSMIT USING DIFFERENT RADIO RESOURCES | |
| MBSFN RS | TRANSMIT USING SAME RADIO RESOURCES | |
| PRS | TRANSMIT | NOT TRANSMIT |
| | TRANSMIT USING SAME RADIO RESOURCES | |

WIRELESS COMMUNICATION SYSTEM USING MULTIPLE TRANSMISSION AND RECEPTION POINTS

CROSS-REFERENCE TO RELATED APPLICATIONS

The present application is a continuation of U.S. application Ser. No. 15/411,812, filed on Jan. 20, 2017, which is a continuation of U.S. application Ser. No. 13/984,880, filed on Aug. 12, 2013 (now U.S. Pat. No. 9,560,663), which is a National Stage Entry of International Application No. PCT/KR2012/001001, filed on Feb. 10, 2012, which claims priority to and benefits of Korean Patent Application Nos. 10-2011-0012798, filed on Feb. 14, 2011 and 10-2011-0012547, filed on Feb. 11, 2011, the content of which are incorporated herein by reference in their entirety.

TECHNICAL FIELD

The present invention relates to a wireless communication system, and more particularly, to a wireless communication system that uses multiple transmission/reception points and can be applied to a wireless communication system having a plurality of transmission/reception points geographically spaced apart from each other in a cell.

BACKGROUND ART

Data transmission rates of wireless communication systems are becoming very high along those of wired communication systems. With such a current trend, standardization of a Coordinated MultiPoint (CoMP) transmission/reception method is under way for a Third Generation Partnership Project (3GPP) Long Term Evolution (LTE) system, which is a fourth generation mobile communication system.

The CoMP transmission/reception method relates to transmission/reception operations between at least two points (site, cell, base station, distributed antenna, etc.) and at least one terminal, and can be divided into uplink CoMP transmission and downlink CoMP transmission.

Uplink CoMP transmission is a transmission method in which a predetermined terminal transmits a signal to a plurality of points geographically spaced apart from each other, and the plurality of points perform joint-processing of the signal received from the terminal, in uplink CoMP transmission, the terminal does not need to know from which network node the signal has been transmitted, or what kind of processing has been performed on the received signal, and only needs to know what kind of downlink signaling is provided in relation to the uplink transmission. Thus, uplink CoMP transmission can be employed with no significant change in the standard of a wireless interface.

Downlink CoMP transmission is a method in which a plurality of points geographically spaced apart from each other cooperatively transmit a signal to at least one terminal. In 3GPP technical report (TR) 36.814, a downlink CoMP category is divided into joint processing (JP) and coordinated beamforming/coordinated scheduling (CB/CS), and JP is divided again into joint transmission (JT), in which multiple points simultaneously perform physical downlink shared channel (PDSCH) transmission, and dynamic point selection (DPS), in which one point performs PDSCH transmission.

JT uses the concept of distributed antennas in which each transmission point of a CoMP cooperating set can use data.

In JT, accurate information on a wireless channel is required, and performance easily varies with delay, an estimation error, and so on.

DPS is a method, where one point of a CoMP cooperating set performs PDSCH transmission at a specific moment. In DPS, a transmission point may dynamically vary, and performance may deteriorate due to feedback delay.

CB/CS is a method, where only a serving point transmits data to a terminal at a specific moment. Since CB/CS is a passive method for avoiding interference between transmission points, it is not expected to give a large capacity increase. Also, when user scheduling/beamforming requires information exchange between different base stations for cooperation between points corresponding to a CoMP cooperating set, a backhaul may be used for information exchange between the different base stations.

Meanwhile, in the 3GPP LTE Release-8 and Release-9 and LTE-Advanced Release-10 standards, all transmission points generally have different physical cell identities (PCIs). Thus, when the aforementioned transmission methods using multiple points are applied to the standards, transmission using multiple points will be performed in an environment in which respective transmission points have individual cell coverage.

For this reason, the existing standards cannot be applied to a multipoint transmission environment in which a plurality of points belong to the same cell and have the same PCI.

DISCLOSURE

Technical Problem

The present invention is directed to providing a wireless communication system that uses multiple transmission reception points and enables communication using a plurality of points in a network environment in which the plurality of points belong to the same cell and have the same physical cell identity (PCI).

Technical Solution

One aspect of the present invention provides a wireless communication system using multiple transmission/reception points and including a first transmission/reception point and at least one second transmission/reception point belonging to the same cell, wherein the first transmission/reception point has wider transmission coverage than the at least one second transmission/reception point, and the first transmission/reception point and the at least one second transmission/reception point generate a downlink transmission signal using the same physical cell identity (PCI).

Here, the first transmission/reception point may transmit a synchronization signal and a cell-specific reference signal (CRS) corresponding to the PCI, and the at least one second transmission/reception point may transmit no signal on radio resources used by the first transmission/reception point to transmit the synchronization signal and the CRS.

Here, the first transmission/reception point and the at least one second transmission/reception point may transmit channel state information (CSI) reference signals (RSs) generated by using the PCI, and the first transmission/reception point and the at least one second transmission/reception point may have different configurations for the CSI-RS and different mappings of radio resources corresponding to the configurations of the CSI-RS.

Here, the first transmission/reception point and the at least one second transmission/reception point may generate a physical multicast channel (PMCH) or a multicast-broadcast single frequency network (MBSFN)-RS using the PCI, and transmit the PMCH or the MBSFN-RS using the same radio resources.

Here, the first transmission/reception point may transmit a physical broadcast channel (PBCH), a physical control format indicator channel (PCFICH), a physical downlink control channel (PDCCH), a physical hybrid automatic repeat request (ARQ) indicator channel (PHICH), or a positioning reference signal (PRS) generated by using the PCI, and the at least one second transmission/reception point may transmit no signal on radio resources used by the first transmission/reception point to transmit the PBCH, the PCFICH, the PDCCH, the PHICH, or the PRS.

Here, the first transmission/reception point and the at least one second transmission/reception point may simultaneously transmit at least one of the PBCH, the PCFICH, the PDCCH, the PHICH, and the PRS using the same radio resources.

Another aspect of the present invention provides a wireless communication system using multiple transmission/reception points and including a base station, and a first transmission/reception point and at least one second transmission/reception point belonging to the same cell managed by the base station, wherein the first transmission/reception point has wider transmission coverage than the at least one second transmission/reception point, and the first transmission/reception point and the at least one second transmission/reception point generate a signal to be transmitted to a terminal using a virtual cell identity (ID) assigned to the terminal.

Here, the first transmission/reception point may transmit a physical downlink shared channel (PDSCH) generated using the virtual cell ID, and when the terminal uses a CSI-RS and a user equipment (UE)-specific RS, the at least one second transmission/reception point may transmit the PDSCH and the UE-specific RS generated using the virtual cell ID to the terminal.

Here, when the terminal uses a CRS, the first transmission/reception point and the at least one second transmission/reception point may simultaneously transmit the PDSCH to the terminal.

Here, the first transmission/reception point and the at least one second transmission/reception point may use radio resources determined using the virtual cell ID for radio resource mapping of a signal transmitted to the terminal through antenna port 5.

Here, the first transmission/reception point and the at least one second transmission/reception point may generate physical channels, which perform functions of a PDCCH and a PHICH respectively, and a PRS using the virtual cell ID, and the generated physical channels respectively performing the functions of the PDCCH and the PHICH may be transmitted using radio resources that can be used for PDSCH transmission by the first transmission/reception point.

Here, the base station may form a cooperating point set with at least one transmission/reception point performing cooperative transmission to the terminal on the basis of CSI reported by the terminal, and the at least one transmission/reception point included in the cooperating point set may simultaneously transmit a PDSCH generated using the virtual cell ID of the terminal and a UE-specific RS for demodulation to the terminal using the same radio resources.

Still another aspect of the present invention provides a wireless communication system using multiple transmission/reception points and including a base station, and a first transmission/reception point and at least one second transmission/reception point belonging to the same cell managed by the base station, wherein the base station transmits CSI-RS measurement information including a CSI-RS or CSI-RSs transmitted by at least one transmission/reception point among the first transmission/reception point and the at least one second transmission/reception point to a terminal, receives a measurement result of the CSI-RS or the CSI-RSs corresponding to the CSI-RS measurement information from the terminal, and then transmits at least one CSI-RS pattern to be measured by the terminal to the terminal on the basis of the received measurement result.

Yet another aspect of the present invention provides a wireless communication system using multiple transmission/reception points and including a base station, and a first transmission/reception point and at least one second transmission/reception point belonging to the same cell managed by the base station, wherein at least one terminal generates an uplink channel and a RS using different virtual cell IDs respectively assigned to the at least one terminal by the base station, and then transmits the uplink channel and the RS to at least one transmission/reception point among the first transmission/reception point and the at least one second transmission/reception point.

Here, the respective at least one terminal may generate at least one signal among a physical uplink shared channel (PUSCH), a physical uplink control channel (PUCCH), a demodulation (DM) RS, and a sounding reference signal (SRS) using the assigned different virtual cell IDs.

Advantageous Effects

In a communication environment in which a plurality of transmission/reception points belonging to the same cell have the same physical cell identity (PCI), a wireless communication system using multiple transmission/reception points as described above provides a physical channel transmission method and a reference signal (RS) transmission method for downlink communication using the plurality of transmission/reception points, and provides a method of transmitting a physical channel and an RS by introducing a virtual cell identity (ID), thereby enabling efficient transmission using a plurality of transmission/reception points while minimizing changes in existing standards.

Also, a cooperative transmission method using a plurality of transmission/reception points belonging to the same cell is provided, so that downlink communication efficiency can be improved.

Further, in a communication environment in which a plurality of transmission/reception points belonging to the same cell have the same PCI, a virtual cell ID is introduced for uplink communication using a plurality of transmission/reception points to provide an uplink physical channel and RS transmission method, thereby improving uplink communication efficiency while minimizing changes in existing standards.

MODES OF THE INVENTION

While the invention is susceptible to various modifications and alternative forms, specific embodiments thereof are shown by way of example in the drawings and will herein be described in detail.

However, it should be understood that there is no intent to limit the invention to the particular forms disclosed, but on the contrary, the invention is to cover all modifications, equivalents, and alternatives falling within the spirit and scope of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms used herein, including technical and scientific terms, have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "terminal" used herein may be referred to as a mobile station (MS), mobile terminal (MT), user equipment (UE), user terminal (UT), wireless terminal, access terminal (AT), terminal, subscriber unit, subscriber station (SS), wireless device, wireless communication device, wireless transmit/receive unit (WTRU), mobile node, mobile, or other terms.

The term "base station" used herein generally denotes a fixed point communicating with a terminal, and may be referred to as a Node-B, evolved Node-B (eNB), base transceiver system (BTS), access point (AP), and other terms.

The term "point" or "transmission/reception point" used herein denotes a transmission/reception apparatus that has at least one transmitting and receiving antenna and can exchange information with a base station connected through an optical fiber, microwaves, etc., and may be referred to as a remote radio head (RRH), a remote radio unit (RRU), a site, a distributed antenna, and so on.

Hereinafter, exemplary embodiments of the present invention will be described in detail. Like numbers refer to like elements throughout the description of the drawings, and description of the same elements will not be reiterated.

Figure 1:
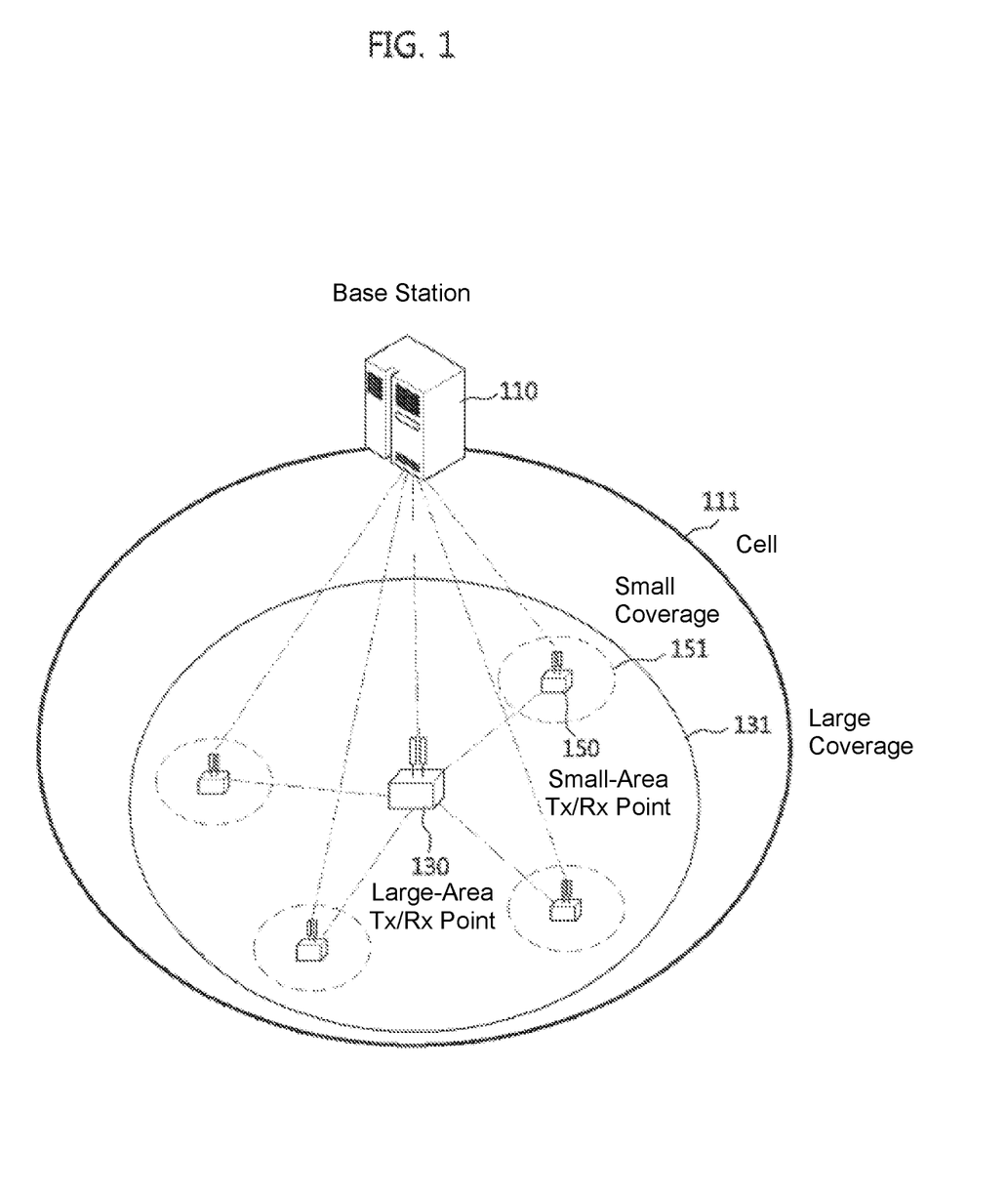
FIG. 1 is a conceptual diagram of a wireless communication system using multiple transmission/reception points according to an exemplary embodiment of the present invention.

FIG. 1 is a conceptual diagram of a wireless communication system using multiple transmission/reception points according to an exemplary embodiment of the present invention.

Referring to FIG. 1, a wireless communication system according to an exemplary embodiment of the present invention may include a base station 110, a large-area transmission/reception point 130 and small-area transmission/reception points 150, and the large-area transmission/reception point 130 and the small-area transmission/reception points 150 may be present in a cell 111 managed by the base station 110. The large-area transmission/reception point 130 forms large transmission coverage 131 using high transmission power, and the small-area transmission/reception points 150 form smaller transmission coverage 151 than the transmission coverage 131 of the large-area transmission/reception point 130 using lower transmission power than the large-area transmission/reception point 130.

Also, as shown in FIG. 1, the respective transmission coverage 151 of the plurality of small-area transmission/reception points 150 may be disposed to be included in the transmission coverage 131 of the large-area transmission/reception point 130, and the small-area transmission/reception points 150 may be connected with the large-area transmission/reception point 130 wirelessly or through a cable to exchange control information and/or data. The plurality of small-area transmission/reception points 150 and the large-area transmission/reception point 130 are connected with the base station 110 through an optical fiber, microwave, etc. to exchange information with the base station 110 and exchange information with other transmission/reception points via, the base station 110.

In the wireless communication system as shown in FIG. 1, two methods may be used to assign physical cell identities (PCIs) to the transmission/reception points 130 and 150 respectively.

In a first PCI assignment method, assignment is performed so that all the transmission/reception points 130 and 150 have different PCIs, and each of the transmission/reception points 130 and 150 forms individual cell coverage. The Third Generation Partnership Project (3GPP) Long Term Evolution (LTE) Release-8 and Release-9 and LTE-Advanced Release-10 standards may be applied to the first method and used.

In a second PCI assignment method, the same PCI is assigned to all the transmission/reception points 130 and 150 belonging to the same cell. The aforementioned 3GPP LTE or LTE-Advanced standards cannot be applied to the second method.

A wireless communication system using multiple transmission/reception points according to an exemplary embodiment of the present invention provides a downlink communication method and an uplink communication method for communication of transmission/reception points when all the transmission/reception points belong to the same cell and are assigned the same cell identity (ID). In exemplary embodiments of the present invention below, it is assumed that communication of a base station and a terminal conforms to the 3GPP LTE-Advanced Release-10 standard.

First, a downlink communication method using multiple transmission/reception points according to an exemplary embodiment of the present invention will be described.

Figure 2:
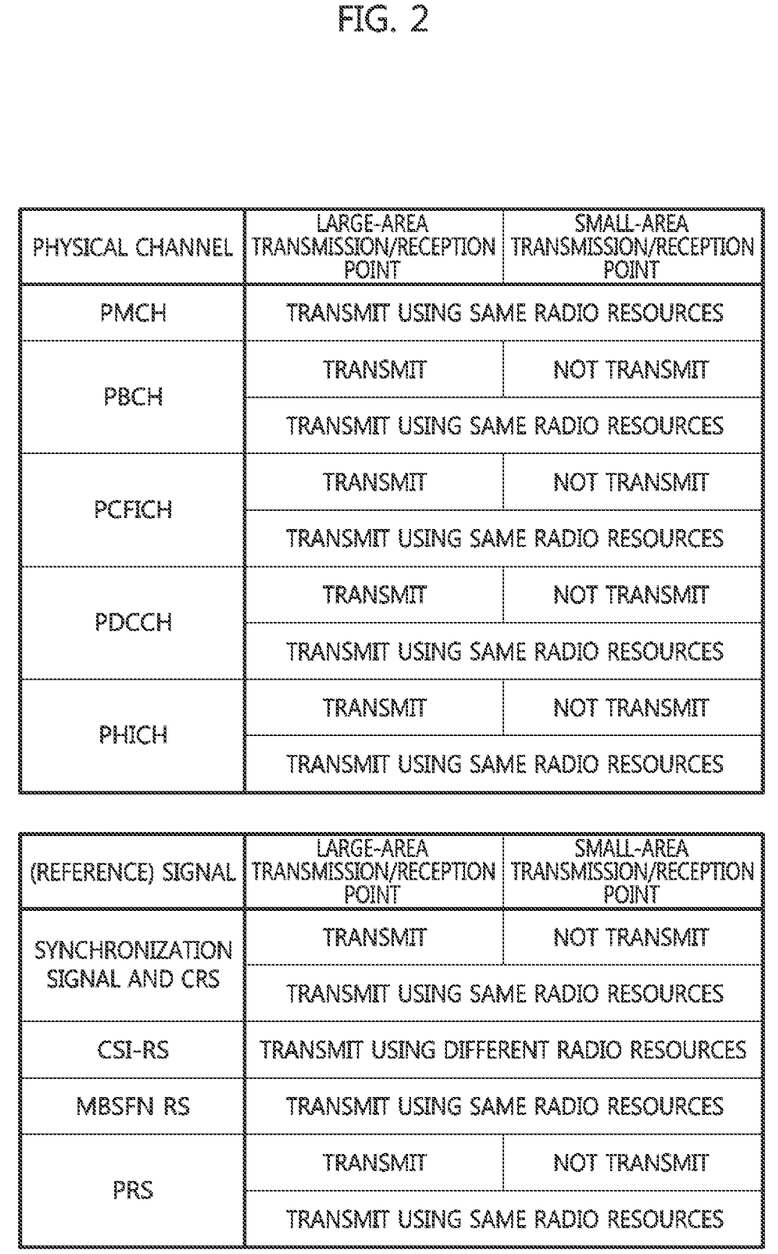
FIG. 2 illustrates a downlink communication method of a wireless communication system using multiple transmission/reception points according to an exemplary embodiment of the present invention.

FIG. 2 illustrates a downlink communication method of a wireless communication system using multiple transmission/reception points according to an exemplary embodiment of the present invention.

A downlink communication method of a wireless communication system using multiple transmission/reception points according to an exemplary embodiment of the present invention will be described in detail below according to respective downlink physical channels and reference signals (RSs) with reference to FIG. 2.

Frame Synchronization

In a downlink communication method using multiple transmission/reception points according to an exemplary embodiment of the present invention, it is assumed that radio frames transmitted by all the transmission/reception points are synchronized with each other. Since all the radio frames are synchronized with each other, it is also assumed that subframes and orthogonal frequency division multiplexing (OFDM) symbols constituting a radio frame are synchronized.

Synchronization Signal and Cell-specific Reference Signal

In a downlink communication method using multiple transmission/reception points according to an exemplary embodiment of the present invention, there are generally two methods for transmitting a synchronization signal and a cell-specific reference signal (CRS). Here, the CRS is used for a terminal to estimate a downlink channel and demodulate a received signal on the basis of the estimated downlink channel.

In a first method, a specific transmission/reception point (e.g., a large-area transmission/reception point) among transmission/reception points transmits a synchronization signal and a CRS corresponding to a PCI using a transmitting antenna of the specific transmission/reception point itself, and other transmission/reception points (e.g., small-area transmission/reception points) transmit no signal on radio resources used by the specific transmission/reception point to transmit the synchronization signal and the CRS.

In a second method, all transmission/reception points simultaneously transmit synchronization signals and CRSs corresponding to a PCI using the same radio resources.

Here, the radio resources denote resource elements in the time-frequency domain defined in the 3GPP LTE and LTE-Advanced standards.

CSI Reference Signal

Each transmission/reception point may transmit its channel state information (CSI)-RS. Here, the CSI-RS is an RS used by a terminal to measure the quality of a downlink channel. Configurations of CSI-RSs transmitted by respective transmission/reception points and mappings of radio resources corresponding to the configurations may differ from each other. Also, a CSI-RS sequence used when each transmission/reception point transmits its CSI-RS may be generated using a PCI.

Physical Multicast Channel or PMCH

All transmission/reception points belonging to the same cell may transmit a physical multicast channel (PMCH) using the same radio resources. Here, the PMCH denotes a physical channel used for a multicast-broadcast single frequency network (MBSFN) operation.

Physical Broadcast Channel or PBCH

A physical broadcast channel (PBCH) is a physical channel used to transmit system information required for a terminal to access a network. A downlink communication method using multiple transmission/reception points according to an exemplary embodiment of the present invention provides two methods for transmitting a PBCH.

In a first method, a large-area transmission/reception point transmits a PBCH. In PBCH transmission, the large-area transmission/reception point uses a PCI to generate a scrambling sequence for bit-level scrambling as defined in the LTE and LTE-Advanced standards. Meanwhile, at least one small-area transmission/reception point transmits no signal on radio resources used by the large-area transmission/reception point to transmit the PBCH.

In a second method, all transmission/reception points belonging to the same cell simultaneously transmit the same PBCH using the same radio resources. In PBCH transmission, the respective transmission/reception points use a PCI to generate scrambling sequences for bit-level scrambling as defined in the LIE and LIE-Advanced standards.

Physical Control Format Indicator Channel or PCFICH

A physical control format indicator channel (PCFICH) is a downlink physical channel used to provide terminals with information required for decoding a physical downlink control channel (PDCCH). A downlink communication method using multiple transmission/reception points according to an exemplary embodiment of the present ion provides two methods for transmitting a PCFICH.

In a first method, a large-area transmission/reception point transmits a PCFICH. Here, the large-area transmission/reception point uses a PCI for radio resource mapping for PCFICH transmission and generation of a scrambling sequence for bit-level scrambling as defined in the LTE and LTE-Advanced standards. Meanwhile, at least one small-area transmission/reception point transmits no signal on radio resources used by the large-area transmission/reception point to transmit the PCFICH.

In a second method, all transmission/reception points belonging to the same cell simultaneously transmit the same PCFICH using the same radio resources. In PCFICH transmission, the respective transmission/reception points use a PCI to generate scrambling sequences for bit-level scrambling as defined in the LTE and LTE-Advanced standards.

Physical Downlink Control Channel or PDCCH

A PDCCH is a downlink physical channel used to transmit downlink control information, such as a scheduling assignment, required for a terminal to receive a physical downlink shared channel (PDCCH) and to transmit information, such as a scheduling grant, for the terminal to transmit a physical uplink shared channel (PUSCH).

A downlink communication method using multiple transmission/reception points according to an exemplary embodiment of the present invention provides two methods for transmitting a PDCCH.

In a first method, a large-area transmission/reception point transmits a PDCCH. In PDCCH transmission, the large-area transmission/reception point uses a PCI for radio resource mapping and generation of a scrambling sequence for bit-level scrambling as defined in the LTE and LTE-Advanced standards. Meanwhile, at least one small-area transmission/reception point transmits no signal on radio resources used by the large-area transmission/reception point to transmit the PDCCH.

In a second method, all transmission/reception points belonging to the same cell simultaneously transmit the same PDCCH using the same radio resources. In PDCCH transmission, the respective transmission/reception points use a PCI to generate scrambling sequences for bit-level scrambling as defined in the LTE and LTE-Advanced standards.

Physical Hybrid ARQ Indicator Channel or PHICH

A physical hybrid automatic repeat request (ARQ) indicator channel (PHICH) is a downlink physical channel used to transmit a hybrid ARQ (HARQ) acknowledgement for notifying a terminal of whether there is a retransmission of a transport block or not.

A downlink communication method using multiple transmission/reception points according to an exemplary embodiment of the present invention provides two methods for transmitting a PHICH.

In a first method, a large-area transmission/reception point transmits a PHICH. In PHICH transmission, the large-area transmission/reception point uses a PCI to generate a cell-specific scrambling sequence as defined in the LTE and LTE-Advanced standards. Meanwhile, at least one small-area transmission/reception point transmits no signal on radio resources used by the large-area transmission/reception point to transmit the PHICH.

In a second method, all transmission/reception points belonging to the same cell simultaneously transmit the same PHICH using the same radio resources. In PHICH transmission, the respective transmission/reception points use a PCI to generate scrambling sequences for bit-level scrambling as defined in the LTE and LTE-Advanced standards.

MBSFN Reference Signal

An MBSFN-RS is an RS used to measure a composite channel of transmission/reception points to each of which a terminal transmits MBSFN data. In a downlink communication method using multiple transmission/reception points according to an exemplary embodiment of the present invention, each transmission/reception point can transmit an MBSFN-RS. Here, respective transmission/reception points may transmit MBSFN-RSs using the same radio resources and the same sequence.

Positioning Reference Signal

A positioning reference signal (PRS) is a signal transmitted so that a base station and/or transmission/reception points can effectively estimate the position of a terminal. The terminal measures the PRS, calculates its position on the basis of a measured value, and transmits the position to the base station and/or the transmission/reception points, or transmits information required for calculating the position of the terminal, thereby enabling the base station and/or the transmission/reception points to determine the position of the terminal.

A downlink communication method using multiple transmission/reception points according to an exemplary embodiment of the present invention provides two methods for transmitting a PRS.

In a first method, a large-area transmission/reception point transmits a PRS. Here, the large-area transmission/reception point uses a PCI for generation of a sequence of a PRS and radio resource mapping of the PRS as defined in the LTE-Advanced standards. Meanwhile, at least one small-area transmission/reception point transmits no signal on radio resources used by the large-area transmission/reception point to transmit the PRS.

In a second method, all transmission/reception points belonging to the same cell simultaneously transmit the same PRS using the same radio resources. Here, the respective transmission/reception points use a PCI for generation of a sequence of the PRS and radio resource mapping of the PRS as defined in the LTE-Advanced standards.

Introduction of Virtual Cell ID

A downlink communication method using multiple transmission/reception points according to an exemplary embodiment of the present invention introduces a virtual cell ID for a terminal supporting the LTE-Advanced Release-11 standard or later standards in a network deployment environment in which a plurality of transmission/reception points belong to the same cell.

In the LTE-Advanced Release-10 standard, an RS sequence used for a UE-specific RS is defined as a pseudo-random sequence, and an initialization value used for generating the pseudo-random sequence is defined to vary according to a PCI. Thus, cells having different PCIs use different pseudo-random sequences as RS sequences. In this way, different cells generate different pseudo-random sequences using different PCIs so as to mitigate inter-cell interference. In particular, all cells use the same radio resources for RSs corresponding to antenna ports 7, 8, 9, 10, 11, 12, 13 and 14, and thus adjacent cells need to use different RS sequences to mitigate interference caused by RSs transmitted from the adjacent cells.

Meanwhile, when a plurality of transmission/reception points transmit different data using the same resources in a transmission environment in which multiple transmission/reception points are used as shown in FIG. 1, transmission/reception points neighboring each other need to use different RS sequences.

Preferably, to use different RSs as mentioned above, the respective transmission/reception points use different initialization values when generating pseudo-random sequences used for generating UE-specific RS sequences.

Figure 3:
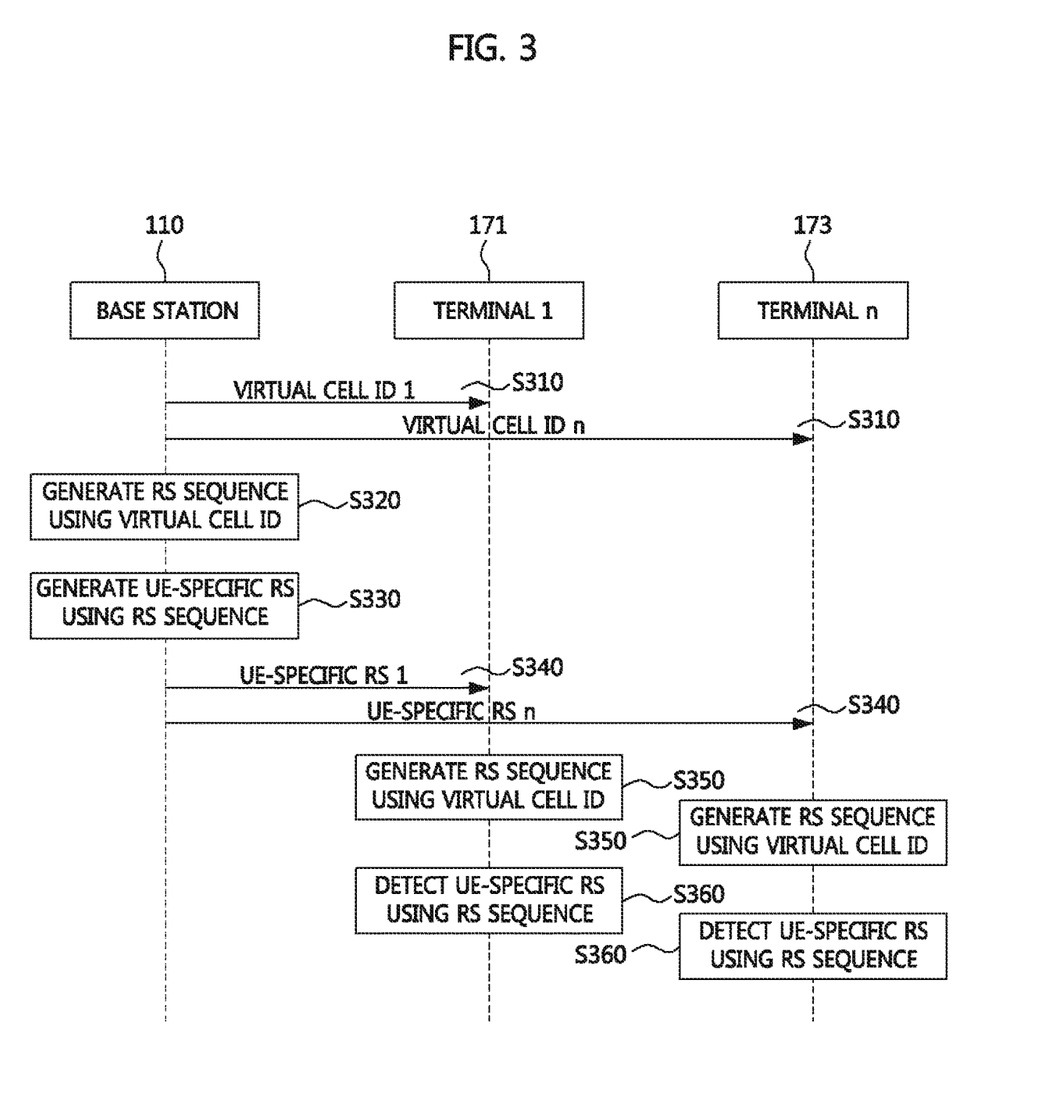
FIG. 3 is a flowchart illustrating an example of use of a virtual cell identity (ID) in downlink transmission using multiple transmission/reception points according to an exemplary embodiment of the present invention.

FIG. 3 is a flowchart illustrating an example of use of a virtual cell ID in downlink transmission using multiple transmission/reception points according to an exemplary embodiment of the present invention.

Referring to FIG. 3, a base station 110 notifies terminals 171 and 173 of virtual cell IDs, respectively (step S310).

Subsequently, the base station 110 generates pseudo-random sequences by using the virtual cell IDs instead of a PCI, thereby generating RS sequences (step S320). Thereafter, the base station 110 generates specific RSs of the respective terminals 171 and 173 using the generated RS sequences (step S330), and then transmits the generated specific RSs of the respective terminals 171 and 173 to the corresponding terminals (step S340). Here, different values can be assigned as the virtual cell IDs to different terminals.

The respective terminals 171 and 173 generate RS sequences using the virtual cell IDs assigned by the base station 110 (step S350), and detect the UE-specific RSs using the generated RS sequences (step S360).

In the case of PDSCH transmission, to generate a scrambling sequence used for bit-level scrambling of each codeword, a base station may generate a pseudo-random sequence by applying a virtual cell ID instead of a PCI. In this case, a terminal generates a scrambling sequence using a virtual cell ID assigned by the base station, and then performs PDSCH detection using the generated scrambling sequence.

A method of using a virtual cell ID in a downlink communication method using multiple transmission/reception points according to an exemplary embodiment of the present invention will be described in detail below.

Physical Downlink Shared Channel or PDSCH

For a terminal supporting the LTE or LTE-Advanced Release-8/9/10 standard, a pseudo-random sequence is generated using a PCI, thereby generating a scrambling sequence used for bit-level scrambling of each codeword.

For a terminal supporting the LTE-Advanced Release-11 standard or the following standards and assigned a virtual cell ID, a scrambling sequence is generated using the virtual cell ID instead of a PCI.

When a terminal supporting the LTE-Advanced Release-11 standard or later standards is assigned no virtual cell ID, a scrambling sequence may be generated using a PCI. For example, in a process in which a terminal performs random access to access a network, the terminal has not yet been assigned a virtual cell ID. Thus, a base station generates a scrambling sequence by applying a PCI to response to random access of the terminal and message transmission, and then performs bit-level scrambling of an encoded codeword using the generated scrambling sequence.

A downlink communication method using multiple transmission/reception points according to an exemplary embodiment of the present invention provides two methods for transmitting a PDSCH.

In a first method, a large-area transmission/reception point transmits a PDSCH. A terminal may demodulate the PDSCH received from the large-area transmission/reception point using a CRS or a UE-specific RS according to a transmission mode.

Meanwhile, when the terminal is configured with a transmission mode in which the terminal obtains channel estimation and channel quality indicator (CQI) information using a CSI-RS and performs data demodulation using a UE-specific RS, at least one small-area transmission/reception point may transmit a PDSCH and a UE-specific RS to the terminal.

On the other hand, when the terminal is configured with a transmission mode in which the terminal obtains channel estimation and CQI information and performs data demodulation using a CRS, at least one small-area transmission/reception point may transmit no PDSCH to the terminal. This is because the at least one small-area transmission/reception point transmits no CRS to the terminal in the first method.

In a second method, when the terminal is configured with a transmission mode in which the terminal obtains channel estimation and CQI information using a CSI-RS and performs data demodulation using a UE-specific RS, respective transmission/reception points belonging to the same cell transmit a PDSCH and a UE-specific RS to the terminal.

On the other hand, when the terminal is configured with a transmission mode in which the terminal obtains channel estimation and CQI information and performs data demodulation using a CSI-RS, all transmission/reception points belonging to the same cell simultaneously transmit the same PDSCH to the terminal.

UE-specific Reference Signal

Each of transmission/reception points belonging to the same cell may transmit a UE-specific RS with a PDSCH.

Here, each transmission/reception point generates a UE-specific RS sequence for a terminal assigned a virtual cell ID using the virtual cell ID instead of a PCI and transmits the UE-specific RS sequence to the terminal, and the terminal receiving the UE-specific RS sequence detects a UE-specific RS using an RS sequence that is generated using the assigned virtual cell ID.

Also, each transmission/reception point generates a UE-specific RS sequence using a virtual cell ID instead of a PCI and transmits the UE-specific RS sequence to a terminal assigned the virtual cell ID, and the terminal receiving the UE-specific RS sequence generates an RS sequence using the virtual cell ID and detects a UE-specific RS.

Further, for a terminal assigned a virtual cell ID, each transmission/reception point uses radio resources determined using the virtual cell ID instead of a PCI in radio resource mapping of a signal (e.g., a UE-specific RS) transmitted through antenna port 5.

On the other hand, each transmission/reception point generates a UE-specific RS sequence using a PCI and transmits the UE-specific RS sequence to a terminal assigned no virtual cell ID, and the terminal receiving the UE-specific RS sequence detects a UE-specific RS using an RS sequence that is generated using the PCI.

Also, for a terminal assigned no virtual cell ID, each transmission/reception point uses radio resources determined by the PCI in radio resource mapping of a signal transmitted through antenna port 5.

Introduction of RRH-PDSCH and RRH-PHICH

In a downlink communication method using multiple transmission/reception points according to an exemplary embodiment of the present invention, respective transmission/reception points belonging to the same cell introduce new physical channels that can respectively perform functions of a PDCCH and a PHICH defined in the LTE or LTE-Advanced standard.

In an exemplary embodiment of the present invention, a new physical channel capable of performing the function of a PDCCH is referred to as RRH-PDCCH, and a new physical channel capable of performing the function of a PHICH is referred to as RRH-PHICH.

Each of transmission/reception points belonging to the same cell transmits an RRH-PDCCH and an RRH-PHICH with a UE-specific RS so that a terminal can demodulate the RRH-PDCCH and the RRH-PHICH. Here, the RRH-PDCCH and the RRH-PHICH may be transmitted using some of radio resources that can be used for PDSCH transmission by a large-area transmission/reception point.

Also, each of the transmission/reception points may use a virtual cell ID for radio resource mapping of the RRH-PDCCH and the RRH-PHICH and generation of a scrambling sequence for bit-level scrambling.

Introduction of RRH-PRS

In a downlink communication method using multiple transmission/reception points according to an exemplary embodiment of the present invention, a new RS is introduced to improve the accuracy of terminal positioning. In the present invention, the new RS is referred to as RRH-PRS.

A plurality of transmission/reception points belonging to the same cell may transmit an RRH-PRS for terminal positioning. Here, each transmission/reception point may use a virtual cell ID for generation of a sequence of the RRH-PRS and radio resource mapping of the RRH-PRS.

CSI Reference Signal-Based Measurement

In a downlink communication method using multiple transmission/reception points according to an exemplary embodiment of the present invention, a CSI-RS based measurement is performed.

Figure 4:
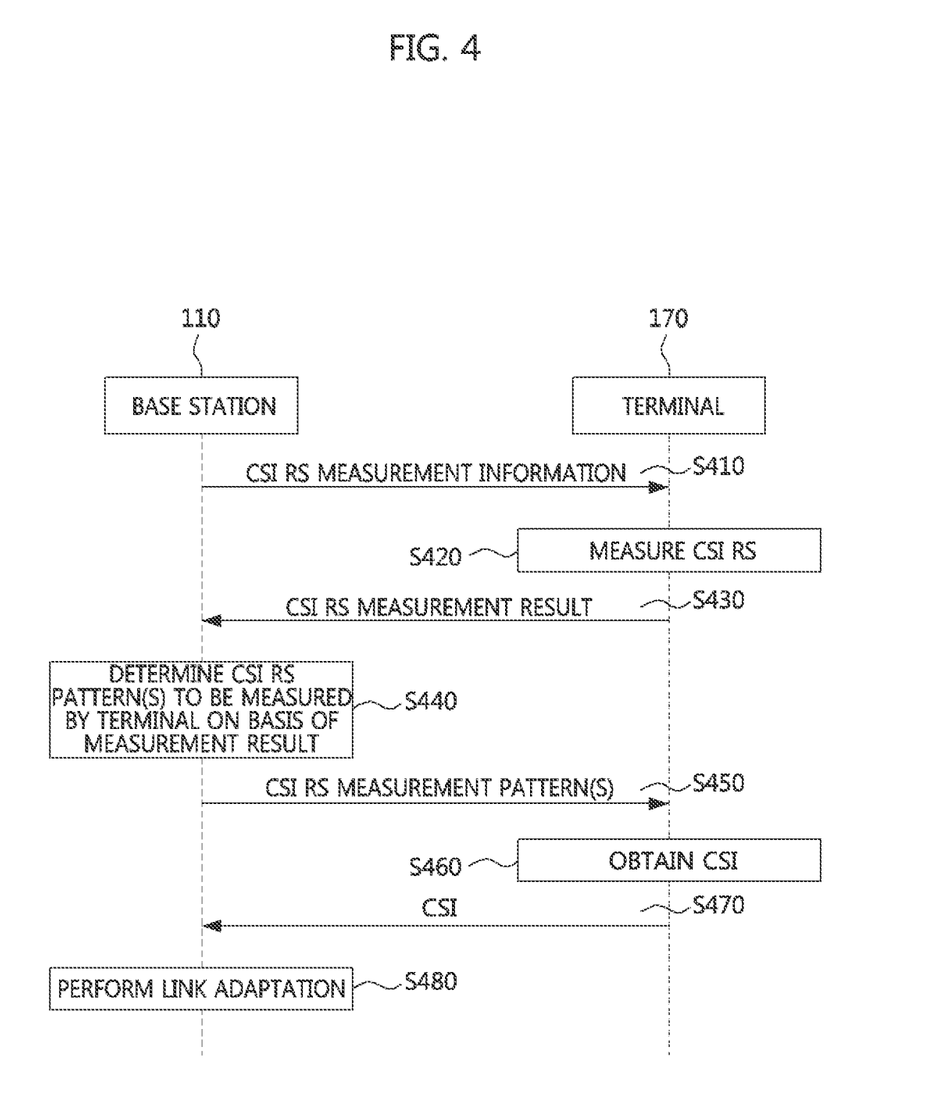
FIG. 4 is a flowchart illustrating a channel state information (CSI) reference signal (RS)-based measurement process in a downlink communication method using multiple transmission/reception points according to an exemplary embodiment of the present invention.

FIG. 4 is a flowchart illustrating a CSI-RS based measurement process in a downlink communication method using multiple transmission/reception points according to an exemplary embodiment of the present invention.

Referring to FIG. 4, a base station 110 transmits, terminal-specifically, CSI-RS measurement information to terminals (step S410). Here, the CSI-RS measurement information may include configuration information corresponding to all or some of CSI-RSs transmitted by respective transmission/reception points, and is set so that a terminal 170 can obtain radio resource pattern information on the time-frequency domain of the CSI-RSs from the configuration information according to a predetermined mapping rule.

The terminal 170 receiving the information for CSI-RS measurement from the base station 110 measures the CSI-RSs included in the CSI-RS measurement information (step S420), and transmits the measurement results to the base station 110 (step S430).

The base station 110 determines a CSI-RS pattern or CSI-RS patterns, which need to be measured by the terminal 170, on the basis of the measurement results received from the terminal 170 (step S440), and transmits the determined CSI-RS pattern or CSI-RS patterns to the terminal 170 (step S450).

The terminal 170 obtains CSI for link adaptation using the CSI-RS pattern or CSI-RS patterns received from the base station 110 (step S460), and reports the obtained CSI to the base station 110 (step S470).

The base station 110 performs link adaptation on the basis of the CSI received from the terminal 170 (step S480).

Cooperative Transmission Between Plurality of Transmission/Reception Points

In a downlink communication method using multiple transmission/reception points according to an exemplary embodiment of the present invention, a base station can perform cooperative multiple transmission/reception point transmission of transmitting data or control information to a terminal using a plurality of transmission/reception points.

In a downlink communication method using multiple transmission/reception points according to an exemplary embodiment of the present invention, a set of transmission/reception points performing cooperative transmission for a terminal will be referred to as a "cooperating point set."

Figure 5:
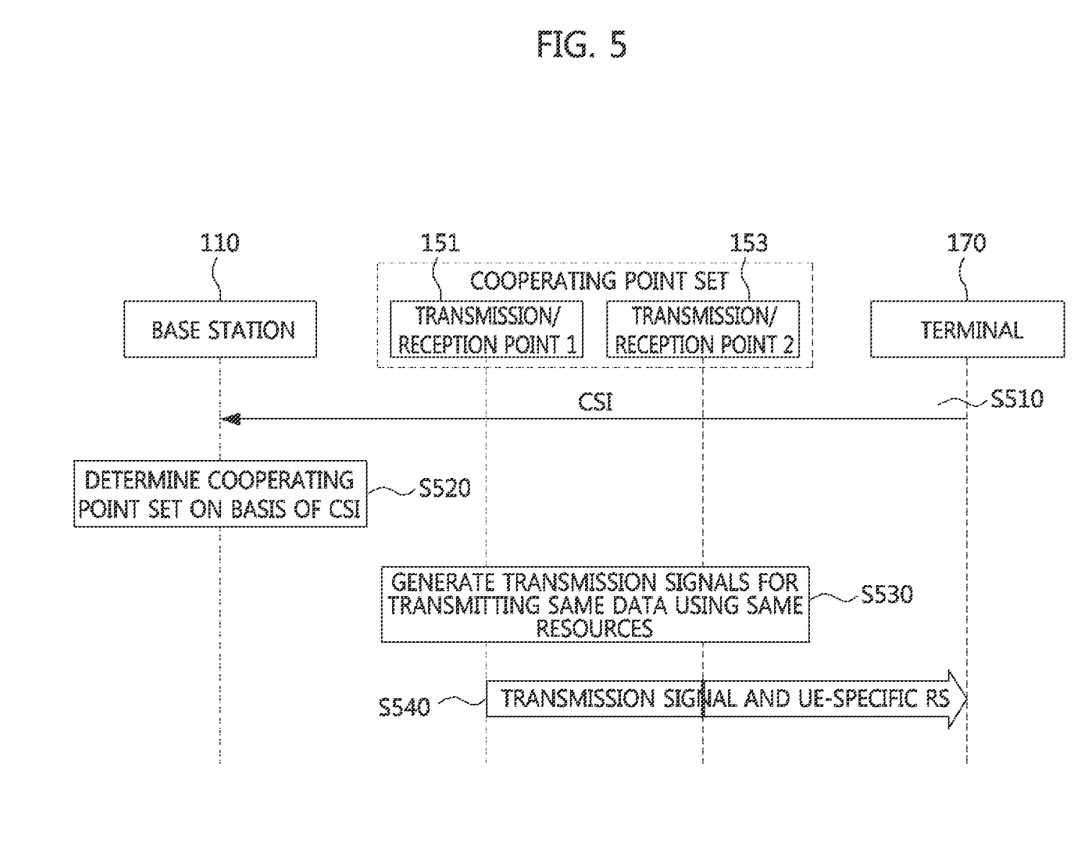
FIG. 5 is a flowchart illustrating a process of performing coordinated multipoint (CoMP) transmission in a downlink communication method using multiple transmission/reception points according to an exemplary embodiment of the present invention.

FIG. 5 is a flowchart illustrating a process of performing coordinated multipoint (CoMP) transmission in a downlink communication method using multiple transmission/reception points according to an exemplary embodiment of the present invention.

First, a base station 110 receives CSI from each terminal 170 (step S510).

Then, the base station 110 determines a cooperating point set, which will perform cooperative multiple transmission/reception point transmission for the terminal 170, on the basis of the received CSI (step S520). In other words, the cooperating point set may be different depending on a channel environment of each terminal 170.

A plurality of transmission/reception points 151 and 153 included in the cooperating point set that perform cooperative multiple transmission/reception point transmission for the terminal 170 generate transmission signals, which will transmit the same data using the same radio resources to the terminal 170, (step S530), and then transmit the generated transmission signals together with UE-specific RSs for demodulation of the terminal 170 to the terminal 170 (step S540).

Here, the plurality of transmission/reception points performing cooperative multiple transmission/reception point transmission need to simultaneously transmit the UE-specific RSs as well, and need to use the same RS sequence. To this end, the plurality of transmission/reception points, which are performing cooperative multiple transmission/reception point transmission transmit PDSCHs and UE-specific RS sequences generated using virtual cell IDs of which the base station notifies the terminal.

An uplink communication method using multiple transmission/reception points according to an exemplary embodiment of the present invention when all the transmission/reception points belong to the same cell and are assigned the same cell ID will be described below.

In an uplink communication method using multiple transmission/reception points according to an exemplary embodiment of the present invention, a terminal may transmit a PUSCH, a physical uplink control channel (PUCCH), a physical random access channel (PRACH), a demodulation (DM) RS and a sounding RS (SRS) through an uplink.

According to the LTE release-8/9 and LTE-Advanced Release-10 standards, a PUSCH, a PUSCH, a DM RS and an SRS are generated using a PCI for the following functions:

Generation of a scrambling sequence of a PUSCH

Cell-specific symbol-level cyclic shift hopping of PUCCH formats 1, 1a, 1b, 2, 2a and 2b Bit-level scrambling sequence generation, cell-specific single carrier-frequency division multiple access (SC-FDMA) symbol-level cyclic shift hopping, and cell-specific SC-FDMA symbol-level scrambling of PUCCH format 3

Base-sequence hopping, sequence-group hopping and sequence hopping of an SRS and a DM RS RS sequence generation and cell-specific slot-level cyclic shift hopping of a PUSCH DM RS Cell-specific symbol-level cyclic shift hopping of a PUCCH DM RS Since terminals supporting the LTE Release-8/9/10 standard generate signals according to the corresponding standards, the terminals generate the aforementioned signals using the same PCI and transmit the generated signals.

Also, to increase frequency use efficiency, resources used by a terminal may be reused according to the locations of terminals. In other words, terminals exerting relatively little influence of interference may transmit the aforementioned signals using the same resources.

Alternatively, to increase frequency use efficiency by spatially reusing frequency resources, resources used by a terminal may be reused on the basis of a transmission/reception point receiving a signal transmitted from a terminal.

An uplink communication method using multiple transmission/reception points according to an exemplary embodiment of the present invention provides a method for a terminal to perform uplink transmission using a virtual cell ID.

Specifically, a terminal is assigned a virtual cell ID by a base station, generates some or all of uplink channels and signals (e.g., PUSCH, PUCCH, DM RS and SRS) using the assigned virtual cell ID instead of a PCI, and transmits the generated signals.

As described above, an uplink communication method using multiple transmission/reception points according to an exemplary embodiment of the present invention allows terminals associated with transmission/reception points adjacent to each other to use different virtual cell IDs, thereby mitigating interference between received signals at the transmission/reception points.

Also, an uplink communication method as described above provides a similar effect as making respective transmission/reception points form cells having unique PCIs. In other words, terminals belonging to different transmission/reception points in the same cell are made as if the terminals belong to different cells.

The above-described uplink communication method using multiple transmission/reception points according to an exemplary embodiment of the present invention can be introduced into the LTE-Advanced Release-11 standard or later standards, and applied to terminals supporting the standards.

However, among the terminals supporting the LTE-Advanced Release-11 standard or later standards, a terminal assigned no virtual cell ID may generate the aforementioned channels and signals using a PCI.

For example, when a terminal performs initial random access to a cell, the terminal has not yet been assigned a virtual cell ID, and thus can use a PCI for transmission of a random access message, a PUCCH acknowledgement/negative acknowledgement (ACK/NACK), and so on.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A wireless communication method comprising:
receiving a physical cell identity at a terminal from a base station;
receiving a first identifier at the terminal from the base station;
receiving, at the terminal, first scrambled bits of first control information on a first control channel through downlink radio resources; and
descrambling, at the terminal, the first scrambled bits at least based on the first identifier,
wherein:
the downlink radio resources comprise a first region of resources and a second region of resources,
the first region includes a physical downlink control channel (PDCCH), and
the second region includes a physical downlink shared channel (PDSCH) and the first control channel.

2. The method of claim 1, further comprising:
receiving second scrambled bits of second control information on the PDCCH; and
descrambling the second scrambled bits at least based on the physical cell identity.

3. The method of claim 2, wherein the physical cell identity is received through a synchronization signal.

4. The method of claim 1, further comprising:
receiving first User Equipment (UE)-specific reference signals on the first control channel; and
processing the first UE-specific reference signals at least based on the first identifier.

5. The method of claim 4, further comprising:
receiving second UE-specific reference signals on the PDCCH; and
processing the second UE-specific reference signals at least based on the physical cell identity.

6. The method of claim 1, wherein the first identifier is a virtual cell identity of the base station, and the first identifier is transmitted from the base station.

7. A communication apparatus comprising:
a memory; and
a processor operably coupled to the memory,
wherein the processor, when executing program instructions stored in the memory, is configured to:
cause the apparatus to receive a physical cell identity from a base station;
cause the apparatus to receive a first identifier from the base station;
cause the apparatus to receive first scrambled bits of first control information on a first control channel through downlink radio resources; and
descramble the first scrambled bits at least based on the first identifier,
wherein:
the downlink radio resources comprise a first region of resources and a second region of resources,
the first region includes a physical downlink control channel (PDCCH), and
the second region includes a physical downlink shared channel (PDSCH) and the first control channel.

8. The apparatus of claim 7, wherein the processor is further configured to:
cause the apparatus to receive second scrambled bits of second control information on the PDCCH; and
descramble the second scrambled bits at least based on the physical cell identity.

9. The apparatus of claim 8, wherein the physical cell identity is received through a synchronization signal.

10. The apparatus of claim 7, wherein the processor is further configured to:
cause the apparatus to receive first User Equipment (UE)-specific reference signals on the first control channel; and
process the first UE-specific reference signals at least based on the first identifier.

11. The apparatus of claim 10, wherein the processor is further configured to:
cause the apparatus to receive second UE-specific reference signals through on the PDCCH; and
process the second UE-specific reference signals at least based on the physical cell identity.

12. The apparatus of claim 7, wherein the first identifier is a virtual cell identity of the base station, and the first identifier is transmitted from the base station.

13. A device for a terminal, the device comprising:
a memory; and
a processor operably coupled to the memory, wherein the processor, when executing program instructions stored in the memory, is configured to:
   cause the terminal to receive a physical cell identity from a base station;
   cause the terminal to receive a first identifier from the base station;
   cause the terminal to receive first scrambled bits of first control information on a first control channel through downlink radio resources; and
   descramble the first scrambled bits at least based on the first identifier,
wherein:
the downlink radio resources comprise a first region of resources and a second region of resources,
the first region includes a physical downlink control channel (PDCCH), and
the second region includes a physical downlink shared channel (PDSCH) and the first control channel.

14. The device of claim 13, wherein the processor is further configured to:
   cause the terminal to receive second scrambled bits of second control information on the PDCCH; and
   descramble the second scrambled bits at least based on the physical cell identity.

15. The device of claim 14, wherein the physical cell identity is received through a synchronization signal.

16. The device of claim 13, wherein the processor is further configured to:
   cause the terminal to receive first User Equipment (UE)-specific reference signals on the first control channel; and
   process the first UE-specific reference signals at least based on the first identifier.

17. The device of claim 16, wherein the processor is further configured to:
   cause the terminal to receive second UE-specific reference signals through on the PDCCH; and
   process the second UE-specific reference signals at least based on the physical cell identity.

18. The device of claim 13, wherein the first identifier is a virtual cell identity of the base station, and the first identifier is transmitted from the base station.

* * * * *